United States Patent
Chen et al.

(10) Patent No.: US 10,691,757 B1
(45) Date of Patent: Jun. 23, 2020

(54) METHOD AND SYSTEM FOR CACHED DOCUMENT SEARCH

(71) Applicant: EMC IP Holding Company LLC, Hopkinton, MA (US)

(72) Inventors: Chao Chen, Shanghai (CN); Jingjing Liu, Shanghai (CN); Lei Zhang, Shanghai (CN); Kunwu Huang, Shanghai (CN); Hongtao Dai, Shanghai (CN); Ying Teng, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 442 days.

(21) Appl. No.: 15/279,883

(22) Filed: Sep. 29, 2016

(51) Int. Cl.
| | |
|---|---|
| *G06F 16/93* | (2019.01) |
| *H04L 29/06* | (2006.01) |
| *G06F 21/60* | (2013.01) |
| *G06F 16/2455* | (2019.01) |

(52) U.S. Cl.
CPC ........ *G06F 16/93* (2019.01); *G06F 16/24552* (2019.01); *G06F 21/604* (2013.01); *H04L 63/101* (2013.01); *H04L 63/104* (2013.01)

(58) Field of Classification Search
CPC . H04L 63/104; H04L 63/101; G06F 17/3048; G06F 16/24552; G06F 16/93; G06F 21/604
USPC ........................................................ 707/783
See application file for complete search history.

(56) References Cited

U.S. PATENT DOCUMENTS

| | | | | |
|---|---|---|---|---|
| 7,921,288 | B1* | 4/2011 | Hildebrand | H04L 63/04 713/165 |
| 8,402,514 | B1* | 3/2013 | Thompson | H04L 63/08 726/4 |
| 9,614,854 | B2* | 4/2017 | Obbard | G06F 16/23 |
| 2006/0041558 | A1* | 2/2006 | McCauley | G06F 17/30309 |
| 2007/0016583 | A1 | 1/2007 | Lempel et al. | |
| 2007/0294236 | A1* | 12/2007 | Vaughan | G06F 17/3033 |

(Continued)

OTHER PUBLICATIONS

"Access Control Caching." Websphere Portal Express 8.5.0. Aug. 1, 2006. https://www.ibm.com/support/knowledgecenter/en/SSYJ99_8.5.0/admin-system/acc_control_cache.html (Year: 2006).*

(Continued)

*Primary Examiner* — Kimberly L Wilson
(74) *Attorney, Agent, or Firm* — Chamberlain, Hrdlicka, White, Williams & Aughtry

(57) ABSTRACT

A method for servicing document search requests. The method includes receiving, by a document management service, a document search query from a requesting user, identifying, in a document repository, by the document management service, a document that matches the search query, and obtaining a permission level by the document management service, from an access control cache, based on a combination of the requesting user and an access control list required by the document. The access control cache is located on the document management service, and the access control cache is populated using content in an access control repository located on a repository server, separate from the document management service. The method further includes making a determination that the permission level is sufficient and based on the determination, returning the document to the requesting user, as a search result.

15 Claims, 18 Drawing Sheets

(56) References Cited

U.S. PATENT DOCUMENTS

| | | |
|---|---|---|
| 2008/0172390 A1 | 7/2008 | Zeller et al. |
| 2011/0093471 A1 | 4/2011 | Brockway et al. |
| 2011/0179075 A1* | 7/2011 | Kikuchi .............. G06F 21/6227 707/769 |
| 2013/0212707 A1* | 8/2013 | Donahue ............. G06F 21/6218 726/29 |
| 2014/0059699 A1 | 2/2014 | Tewksbary et al. |
| 2016/0098405 A1* | 4/2016 | Gorbansky ......... G06F 17/3033 707/749 |

OTHER PUBLICATIONS

"IBM Web Cache Manager Shortens Internet Access Times." Sep. 29, 1998. https://www-03.ibm.com/press/us/en/pressrelease/2454.wss (Year: 1998).*

* cited by examiner

```
<dmftdoc dmftkey="0900000180001b3b" dss_tokens=":dftxml:1" lang="en">
<dmftkey>0900000180001b3b</dmftkey>
<dmftmetadata>
    <dm_sysobject>
        <r_object_id dmfttype="dmid">0900000180001b3b</r_object_id>
        <object_name dmfttype="dmstring">THE BOOK OF JACOB, the Brother
of Nephi-Chapter 5-61</object_name>
        <r_creation_date dmfttype="dmdate">2013-10-31T17:48:23</
r_creation_date>
            ...
    </dm_sysobject>
</dmftmetadata>
...
<dmftsecurity>
    <acl_name dmfttype="dmstring">dm_450166e599a454d9</acl_name>
    <acl_domain dmfttype="dmstring">RepositoryA</acl_domain>
    <ispublic dmfttype="dmbool">true</ispublic>
</dmftsecurity>
...
<dmftcontents>
</dmftcontents>
...
</dmftdoc>
```

FIG. 8A

```xml
<acl>
    <r_object_id>450166e599a454d9</r_object_id>
    <object_name>dm_450166e599a454d9</object_name>
    <owner_name>RepositoryA</owner_name>
    ...
    <accessors>
        <accessor>
            <r_accessor_name>dm_world</r_accessor_name>
            <r_accessor_permit>1</r_accessor_permit>
            <r_accessor_xpermit>0</r_accessor_xpermit>
            <r_is_group>false</r_is_group>
            <r_permit_type>0</r_permit_type>
            <r_application_permit/>
        </accessor>
        <accessor>
            <r_accessor_name>dm_owner</r_accessor_name>
            <r_accessor_permit>7</r_accessor_permit>
            <r_accessor_xpermit>0</r_accessor_xpermit>
            <r_is_group>false</r_is_group>
            <r_permit_type>0</r_permit_type>
            <r_application_permit/>
        </accessor>
        <accessor>
            <r_accessor_name>userA</r_accessor_name>
            <r_accessor_permit>5</r_accessor_permit>
            <r_accessor_xpermit>0</r_accessor_xpermit>
            <r_is_group>false</r_is_group>
            <r_permit_type>0</r_permit_type>
            <r_application_permit/>
        </accessor>
        <accessor>
            <r_accessor_name>groupA</r_accessor_name>
            <r_accessor_permit>3</r_accessor_permit>
            <r_accessor_xpermit>0</r_accessor_xpermit>
            <r_is_group>true</r_is_group>
            <r_permit_type>0</r_permit_type>
            <r_application_permit/>
        </accessor>
        <accessor>
            <r_accessor_name>groupB</r_accessor_name>
            <r_accessor_permit>3</r_accessor_permit>
            <r_accessor_xpermit>0</r_accessor_xpermit>
            <r_is_group>true</r_is_group>
            <r_permit_type>0</r_permit_type>
            <r_application_permit/>
        </accessor>
    </accessors>
</acl>
```

FIG. 8B

```
<group>
    <r_object_id>1201262c80009e17</r_object_id>
    <group_name>groupA</group_name>
    <users_names>
      <users_names>userB</users_names>
      ...
    </users_names>
    <groups_names>
      <groups_names>groupC</groups_names>
      ...
    </groups_names>
    <is_dynamic>false</is_dynamic>

...
</group>
```

FIG. 8C

| User Name | ACL : permission level |
|---|---|
| userA | acl1:3, acl2:5, acl3:1, ... |
| userB | acl2:1, acl3:5, acl4:1, ... |
| userC | acl2:3, acl5:1, acl6:1, ... |

| User Name | Groups |
|---|---|
| userA | groupA |
| userB | groupA, groupB |
| userC | groupC |

METHOD AND SYSTEM FOR CACHED DOCUMENT SEARCH

BACKGROUND

A significant amount of content is stored in document repositories. The access and manipulation of this content is typically restricted using various types of access control mechanisms. Accessing content in a content repository may be a two-stage process. In the first stage, all documents matching a query issued by a user may be obtained. In a second stage, access control mechanisms may be applied to the retrieved documents in order to identify only the documents that the user is permitted to access. This limited set of documents is then provided to the user. This two-stage process can introduce a significant amount of latency in the retrieval of content from the document repositories.

BRIEF DESCRIPTION OF DRAWINGS

FIGS. 8A-8C show an exemplary document description, an exemplary access control list and an exemplary group list, respectively, in accordance with one or more embodiments of the technology.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-10, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for using a security filter to return only search results that the user performing the search is authorized to receive. The determination of the search results to be returned, in accordance with one or more embodiments of the technology, is a two-stage process. In the first stage, all documents matching the query issued by the document-requesting user are obtained. In the second stage, access control mechanisms are applied to the retrieved documents in order to identify only the documents that the user is permitted to access. More specifically, embodiments of the technology relate to improving performance, decreasing latencies and/or reducing timeouts in servicing search queries to document repositories by relying on a cache for the second stage. The cache may store user and/or group information that allows rapid determination of the documents to be reported to the user, by avoiding the need for time and bandwidth consuming queries of repositories that include user, group and access permission information.

Figure 1:
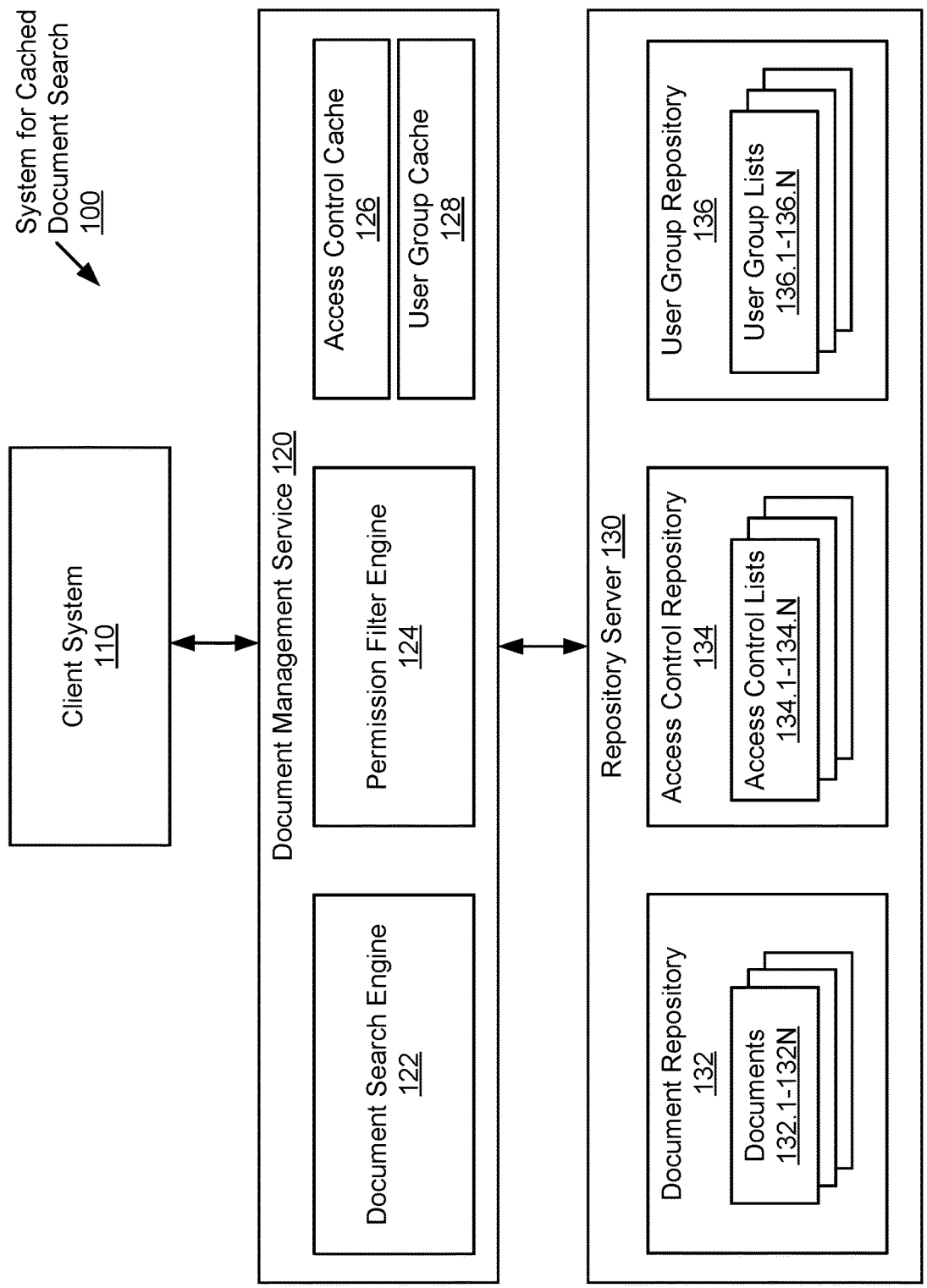
FIG. 1 shows an exemplary system for cached document search, in accordance with one or more embodiments of the technology.

FIG. 1 shows an exemplary system for cached document search, in accordance with one or more embodiments of the technology. The system includes a client system (110) (or multiple client systems), a document management service (120), and a repository server (130). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system (110) corresponds to any computing system (see e.g., FIG. 10) that includes functionality to issue document search requests (also referred to as queries) to the document management service (120) and to receive a corresponding response(s) from the document management service after the request has been serviced.

Continuing with the discussion of FIG. 1, the document management service (120) includes functionality to perform all or a portion of the methods shown in FIGS. 2-7E. The document management service may also include functionality to perform various actions (e.g., read, write, delete, modify, send, etc.) on the objects stored in the document repository (132) the access control repository (134) and/or the user group repository (136), when servicing requests from the client system and/or requests issued by another party, e.g., an administrator. The document management service may be implemented using one or more computing systems (see e.g., FIG. 10).

The document management service, in accordance with one or more embodiments of the technology, includes a document search engine (122), a permission filter engine (124), an access control cache (126) and a user group cache (128).

The document search engine (122), in accordance with one or more embodiments of the technology, performs the first stage of the two-stage process for determining search results in response to a search query. The document search engine (122) thus interfaces with the document repository (132) and performs at least some of the steps described in FIG. 2. In response to a search query, the document search engine may identify all documents that match the search query in the document repository. Any kind of indexed or non-indexed search may be performed, without departing from the technology.

The permission filter engine (124), in accordance with one or more embodiments of the technology, performs the second stage of the two-stage process for determining search results in response to a search query. More specifically, the permission filter engine (124) applies a permission-based filter to the search results obtained by the document search engine (122), by performing at least some of the methods described in FIGS. 2-7E. The output of the permission filter engine (124) thus is a set of documents to be reported to the requesting user. In order to perform the permission-based filtering, the permission filter engine (124) relies on data sets that, for one or more users, establish sets of permissions. When determining whether a document is to be reported to the requesting user, the permission filter engine searches these data sets to identify the permissions that the requesting user has to the document. The document is reported to the user only if these permissions turn out to be sufficient. In the system for cached document search, in accordance with one or more embodiments of the technology, an access control cache (126) and a user group cache (128) are established to reduce the need for time and bandwidth intense queries of the access control repository (134) and/or the user group repository (136), in accordance with an embodiment of the technology. The permission filter engine, in one or more embodiments of the technology, generates the access control cache (126) and the user group cache (128) from the access control repository (134) and the user group repository (136), as subsequently described with reference to FIGS. 2-7E.

In one or more embodiments of the technology, the document management service (120) includes the access control cache (126) and the user group cache (128). The access control cache (126), in accordance with one or more embodiments of the technology, includes entries that associate permission levels with users. The access control list may specify, for example, that a user A has the permission level "read". Multiple permission levels may be assigned to a user. For example, user A may have the permission level "read", according to a first access control list, and user A may in addition have the permission level "view", according to a second access control list. Accordingly, when querying the access control cache to determine a permission level, a user name and the name of the access control list may be provided in order to obtain, in return, a permission level.

In one embodiment of the technology, the access control cache is derived from the access control repository (134), as described below with reference to FIGS. 2-7E. An exemplary access control cache is shown in FIG. 8D. Those skilled in the art will appreciate that the format of the access control cache may deviate from the exemplary access control cache of FIG. 8D, without departing from the technology.

The user group cache (128), in accordance with one or more embodiments of the technology stores group memberships of users. For example, the user group cache (128) may establish that user B is member of user groups A and B. Such group membership may be relevant when determining user privileges because groups may have various privilege levels, and users that are members of groups may inherit privilege levels from these groups.

In one embodiment of the technology, the user group cache is derived from the user group repository (134), as described below with reference to FIGS. 2-7E. An exemplary user group cache is shown in FIG. 8E. Those skilled in the art will appreciate that the format of the user group cache may deviate from the exemplary user group cache of FIG. 8E, without departing from the technology.

Continuing with the discussion of FIG. 1, the repository server (130), includes functionality to store documents in a document repository (132), to store access control information in an access control repository (134) and to store user group information in a user group repository (136). These repositories (132-136) may be hosted on any type of non-volatile (or persistent) storage, including, for example, a hard disk drive, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM), a redundant array of independent disks (RAID), network attached storage (NAS), cloud storage, etc. Further, at least some of the content in the repositories (132-136) may alternatively or in addition be stored in volatile memory, e.g., Dynamic Random-Access Memory (DRAM), Synchronous DRAM, SDR SDRAM, and DDR SDRAM.

The document repository (132), the access control repository (134) and/or the user group repository (136) may be implemented using any format suitable for the storage of the corresponding entries in these repositories. One or more of these repositories may be, for example, a collection of text or binary files, spreadsheets, SQL databases etc. or any other type of hierarchical, relational and/or object oriented collection of data.

The document repository (132), in accordance with an embodiment of the technology, hosts a collection of documents (132.1-132.N) that may be searched upon request by a user. The documents in the document repository may include any type of content and may be text documents encoded in various formats, or hybrid documents including text content in combination with other, non-text content. In one embodiment of the technology, the documents in the document repository are indexed to facilitate and/or accelerate the search for documents. The resulting indexing data may be stored in the document repository or in a separate repository, without departing from the technology.

In one embodiment of the technology, each document is accompanied by a document description (see FIG. 8A for an exemplary document description). The document description may specify, for example, the type of the document, the name of the document, and/or an access control list identifier. The access control list identifier, in accordance with an embodiment of the technology, defines what access control list to refer to, in order to identify whether a requesting user is authorized to access the document, as further described below with reference to FIGS. 2-7E. The access control list identifier may be the name of an access control list that may be stored in the access control repository, or it may be a combination of a name of an access control list and other features such as an access control list domain to provide structure to a set of access control lists, e.g., hierarchically. In the exemplary document description of FIG. 8A, the access control list identifier is marked by dashed lines.

The access control repository (134), in accordance with an embodiment of the technology, hosts a collection of access control lists (134.1-134.N). An exemplary access control list is shown in FIG. 8B. While FIG. 8B shows an access control list in a particular format, those skilled in the art will appreciate that an access control list may be in other formats, without departing from the technology. An access control list may include an access control list identifier. The access control list identifier is unique to the access control list and may be used to distinguish the access control list from other access control lists in the access control repository. In the exemplary access control list of FIG. 8B, the access control list identifier is marked by dashed lines. The access control list identifier, specified in the exemplary document description of FIG. 8A, matches the access control list identifier of the exemplary access control list of FIG. 8B, and accordingly, the exemplary access control list of FIG. 8B would need to be consulted to determine whether a user is authorized to access the exemplary document associated with the exemplary document description of FIG. 8A.

The access control repository further specifies a list of accessors, in accordance with an embodiment of the technology. An accessor, in accordance with an embodiment of the technology, is an entity that may be authorized to access a document. An accessor may be a particular user, identified, e.g., by a user name, or a group of users. For each accessor, whether the accessor is a user or a group of users, the access control repository specifies a permission level. Based on this permission level, a user matching the accessor (if the accessor is a user) of a user being a member of the accessor (if the accessor is a group of users), may or may not be allowed to obtain a document and/or may be limited to certain operations on the document. A permission level may be, for example, "none", "browse", "read", "write", "delete", or any other permission level established by a system administrator.

The combination of all access control lists (134.1-134.N) stored in the access control repository (134), in accordance with an embodiment of the technology, specifies all permissions of all users of the system (100).

Continuing with the discussion of the system (100), the user group repository (136), in accordance with an embodiment of the technology, establishes a grouping of users, as specified in a user group list. A group of users may include a set of users and/or other groups of users. Accordingly, groupings of users may be established in the user group repository in one or more hierarchical levels, including groups, parent groups, etc. For each of these groups, the access control repository may include an accessor entry that defines the permission level of the group. Accordingly, the user group list in the user group repository enables the assignment of permission levels to users without specifying a permission level for each individual user.

An exemplary user group list is shown in FIG. 8C. While FIG. 8C shows a user group list in a particular format, those skilled in the art will appreciate that a user group list may be in other formats, without departing from the technology. User group lists may be provided, for example, as text documents or spreadsheets, or may be organized in any kind of database. An individual user group list may specify one or more groups, e.g., by the names of these groups. For each group, the members of the group are specified. A member may be another group or a user. A group may contain any number of members.

The technology is not limited to the architecture of the system (100) shown in FIG. 1. Specifically, although FIG. 1 shows a single repository server (130), a single document repository (132), a single access control repository (134) and a single user group repository (136), those skilled in the art will appreciate that one or more of these elements may be distributed over multiple repositories, and that the repositories may be local and/or remote. Further, the system (100) may include any number of client systems (110).

FIGS. 2-7E show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel.

Figure 2:
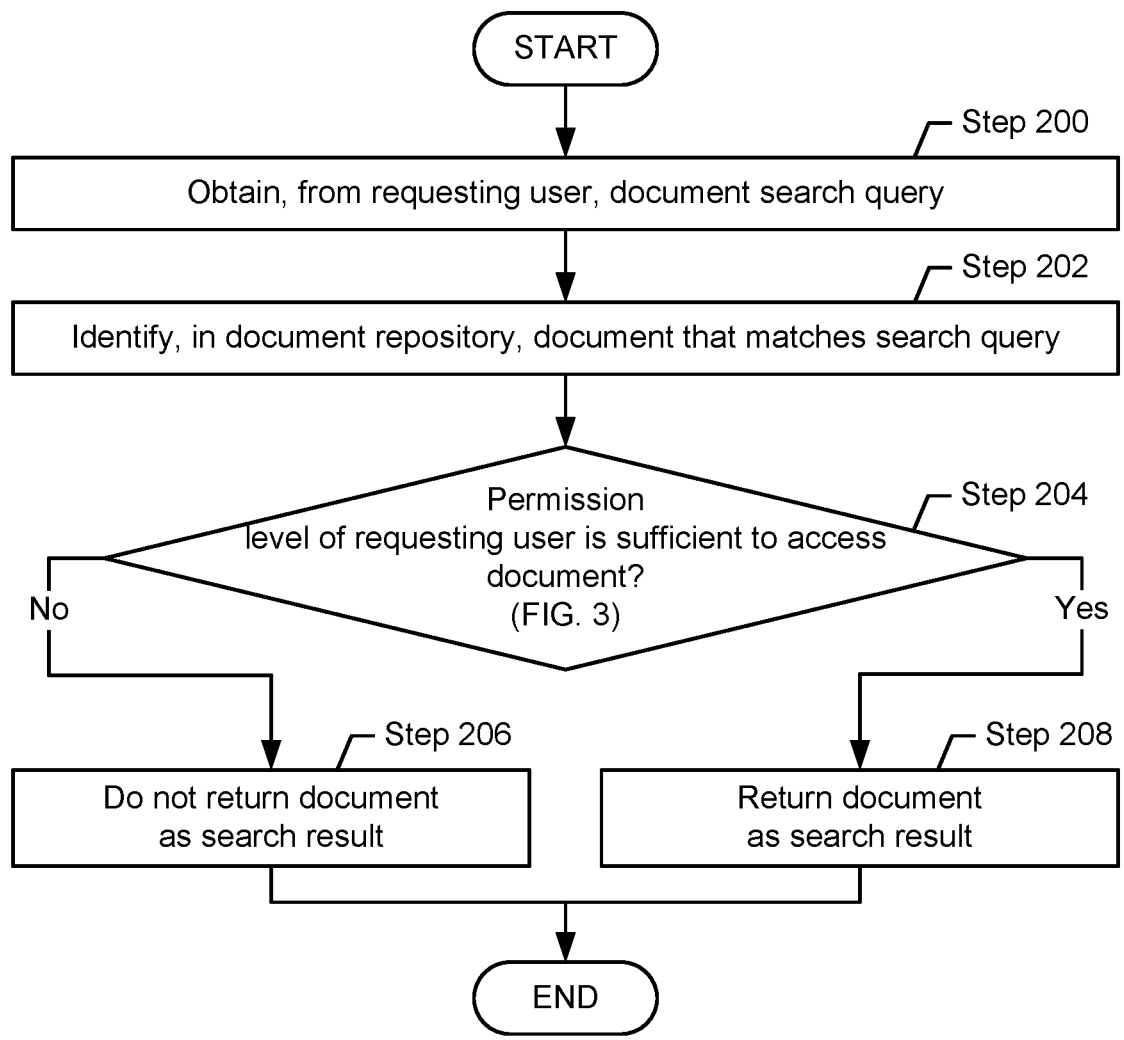
FIG. 2 shows a method for performing a document search, in accordance with one or more embodiments of the technology.

FIG. 2 shows a method for performing a document search, in accordance with one or more embodiments of the technology. The method may be executed once a user submits a search query via the client system. Although the method as described is performed for a single document that matches the search query, those skilled in the art will appreciate that the method may commonly be executed for many documents that match the search query.

Turning to FIG. 2, in Step 200, a document search query is obtained from the requesting user, e.g., via the client system. The search query may be submitted in any form that enables the system for cached document search to identify, in the document repository, documents that match the search query. The search query, in accordance with an embodiment of the technology, includes search terms (e.g., individual words, sentences, paragraphs, etc.) that are to be located in the documents that are stored in the document repository.

In Step 202, a document that matches the search query is identified in the document repository. The identification of a matching document may be performed by the document search engine. Multiple or many matching documents may be found, if multiple/many documents match the search query. In such a scenario, the subsequent Steps 204-208 may be performed for each of the identified documents.

In Step 204, a determination is made about whether the permission level of the requesting user is sufficient to access the document. The details related to making the determination are discussed in detail below, with reference to FIG. 3. If the requesting user's permission level is determined to be insufficient to grant access to the document, the method may proceed to Step 206, in which the document is not returned to the user as a search result. In contrast, if the requesting user's permission level is determined to be sufficient to grant access to the document, the method may proceed to Step 208, in which the document is returned to the user as a search result.

Figure 3:
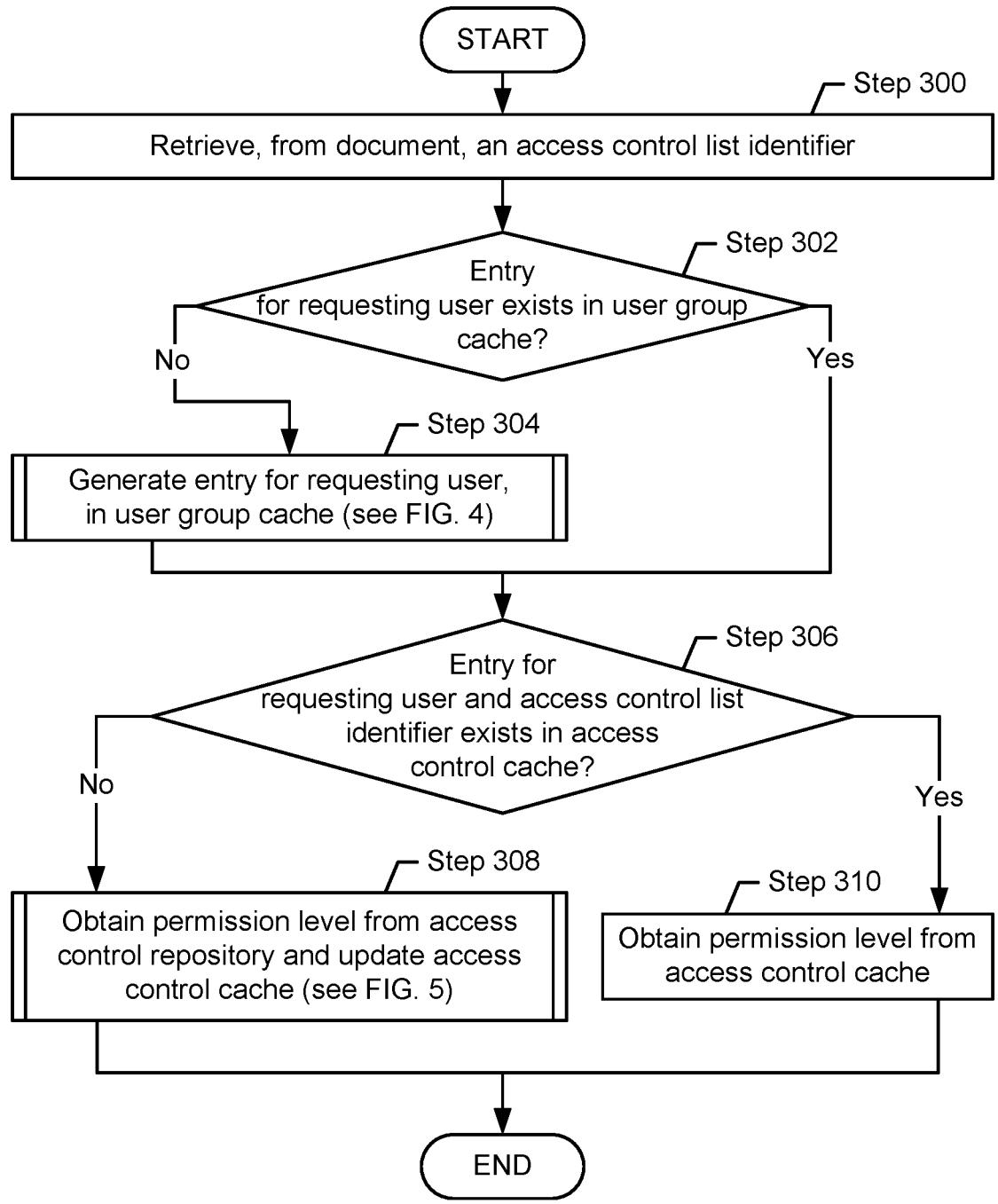
FIG. 3 shows a method for determining whether a permission level of the document requesting user is sufficient to return a detected document as a search result, in accordance with one or more embodiments of the technology.

FIG. 3 shows a method for determining whether a permission level of the document requesting user is sufficient to return a detected document as a search result, in accordance with one or more embodiments of the technology.

Turning to FIG. 3, in Step 300, an access control list identifier is retrieved from the document. As previously described, the access control list identifier names the access control list to be relied upon for determining the access permission level.

In Step 302, a determination is made about whether an entry for the requesting user exists in the group cache. If the entry exists, the method may directly proceed to Step 306. If the entry does not exist, the method may proceed to Step 304.

In Step 304, an entry is generated in the user group cache, for the requesting user. The details of Step 304 are provided in FIG. 4.

In Step 306, a determination is made about whether an entry for the requesting user exists in the access control cache. If the entry does not exist, the method may proceed to Step 308, whereas if the entry does exist, the method may proceed to Step 310.

In Step 308, the permission level for the requesting user is obtained from the access control repository, and the access control cache is updated to include an entry for the requesting user. The details of Step 308 are provided in FIG. 5.

In Step 310, the permission level is obtained from the access control cache. The permission level may be obtained by locating the entry in the access control cache where the user name stored in the entry matches the requesting user's name, and where the access control list identifier obtained in Step 300 matches the access control list identifier associated with the entry. The privilege level where both user name and access control list identifier match is the privilege level to be retrieved.

Figure 4:
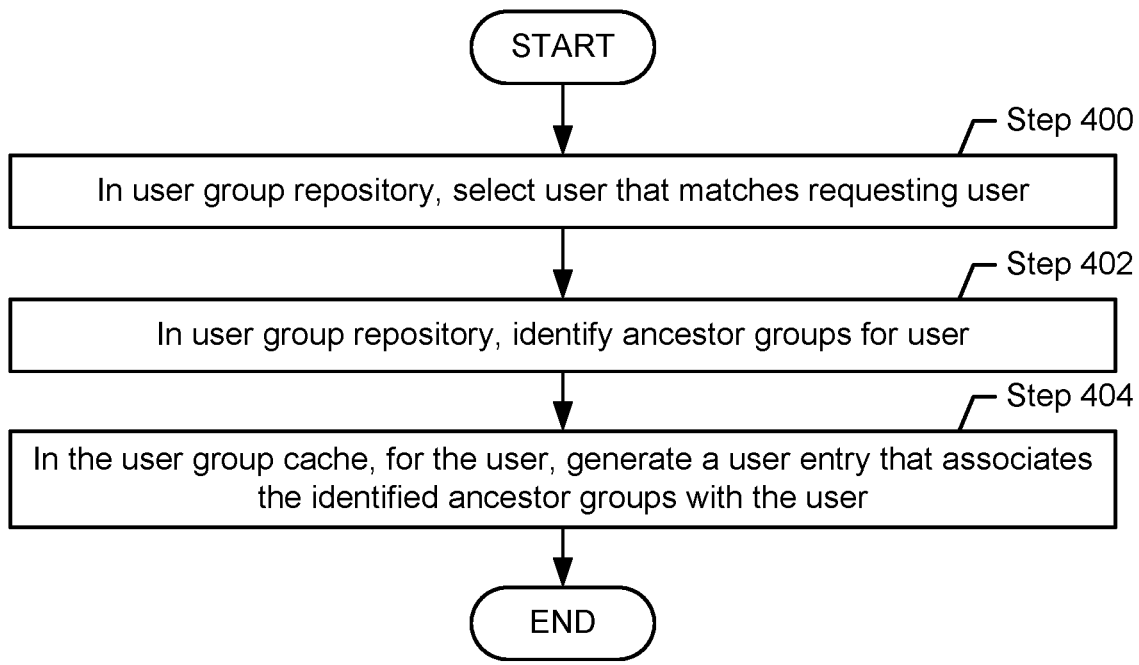
FIG. 4 shows a method for adding an entry for the document-requesting user to the user group cache, in accordance with one or more embodiments of the technology.

FIG. 4 shows a method for adding an entry for the requesting user to the user group cache, in accordance with one or more embodiments of the technology.

Turning to FIG. 4, in Step 400, instances of the requesting user's name are located in the user group repository. A single user entry, multiple user entries, or no user entry may be found. In Step 402, for the located user entries, all ancestor groups are identified. The identification of ancestor groups may require multiple iterations of parsing the user group repository for ancestor groups. For example, for a user A, it may first be determined that user A is a member of group A. Next it may be determined that group A is a member of group B, etc. A user may be a member of any number of groups, and a group may also be a member of any number of other groups.

In Step 404, an entry is made in the user group cache, for the user, based on the information obtained in Step 402. The entry shows all ancestor groups identified in Step 402 as associated with the user. In the above example, an entry for user A would be made, that indicates that user A is a member of groups A and B.

Figure 5:
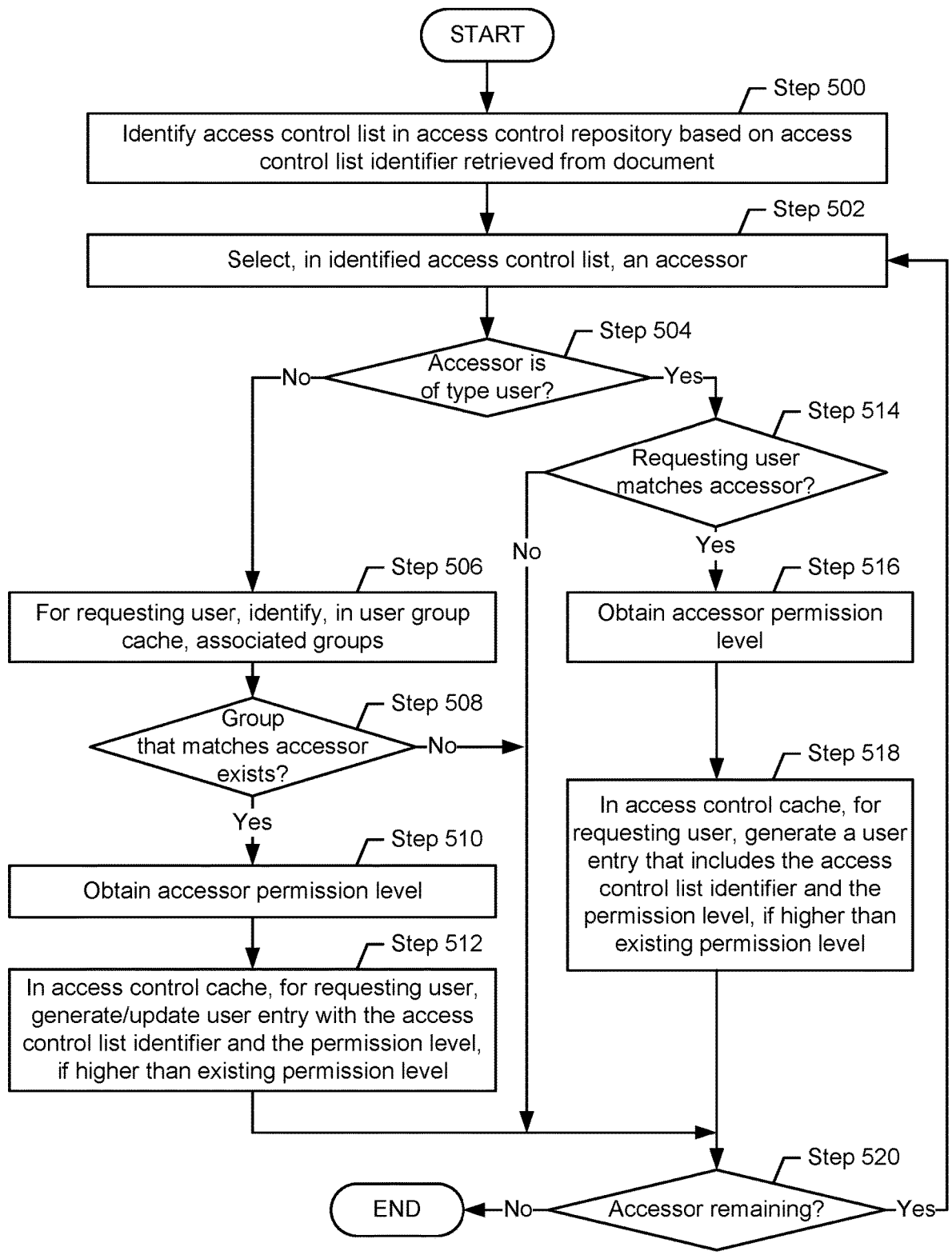
FIG. 5 shows a method for obtaining a permission level for the combination of the document-requesting user and an access control list identifier, and for adding an entry for the document-requesting user to the access control cache, in accordance with one or more embodiments of the technology.

FIG. 5 shows a method for obtaining a permission level based on the combination of the document-requesting user and the access control list identifier obtained from the document, and for updating the access control cache, in accordance with one or more embodiments of the technology. The execution of the method of FIG. 5 may be necessary if, in Step 306, either the name of the requesting user could not be located in the access control cache, or although the name of the requesting user could be located in the access control cache, the access control list identifier associated with the document could not be located in the access control cache.

In Step 500, the correct access control list is identified in the access control repository. The correct access control list, in accordance with an embodiment of the technology, is the access control list whose access control list identifier matches the access control list identifier of the document (obtained in Step 300).

Subsequently, the access control list is analyzed for user privilege information. In one embodiment of the technology, the access control list is structured by accessors. Accordingly, each accessor is subsequently analyzed for user permission information, as described below. The highest user privilege level obtained from this analysis, in accordance with an embodiment of the technology, is the user permission level to be reported back, and to be entered in the access control cache.

In Step 502, an accessor is selected from the access control list in the access control repository. The accessor may be selected for example, based on the order of the accessors in the access control list, or in any other order.

In Step 504, a determination is made about the type of the accessor. If the accessor is of type "group", the method may proceed to Step 506.

In Step 506, for the requesting user, obtain, from the user group cache, the groups associated with the user.

In Step 508, a determination is made about whether one of the groups identified in Step 506, matches the accessor selected in Step 502. If none of the groups matches the accessor, the method may immediately proceed to Step 520. If one of the groups matches the accessor, the method may proceed to Step 510.

In Step 510, the accessor permission level is obtained. The accessor permission level may be obtained from the accessor entry in the access control repository.

In Step 512, the permission level, obtained in Step 510, is written to the user entry for the requesting user in the access control cache, if the permission level is higher than the permission level currently stored for the user or if no permission level is currently stored for the user. As previously noted, permission levels in the access control cache may be separately stored for different access control lists. In such a case, only the permission level of the access control list identified by the access control list identifier that was obtained in Step 500, is updated, but not the other permission levels associated with other access control lists for the same user.

Returning to Step 504, if a determination is made that the accessor is of type "user", the method may proceed to Step 514.

In Step 514, a determination is made about whether the requesting user matches the accessor. If the user does not match the accessor, the method may immediately proceed to Step 520. If the user matches the accessor, the method may proceed to Step 516.

In Step 516, the accessor permission level is obtained. The accessor permission level may be obtained from the accessor entry in the access control repository.

In Step 518, the permission level, obtained in Step 516, is written to the user entry for the requesting user in the access control cache, if the permission level is higher than the permission level currently stored for the user or if no permission level is currently stored for the user. As previously noted, permission levels in the access control cache may be separately stored for different access control lists. In such a case, only the permission level of the access control list identified by the access control list identifier that was obtained in Step 500, is updated, but not the other permission levels associated with other access control lists for the same user.

In Step 520, a determination is made about whether additional accessors are remaining in the access control list of the access control repository. If additional accessors are remaining, the method may return to Step 502 to repeat above described steps for a different accessor.

Figure 6:
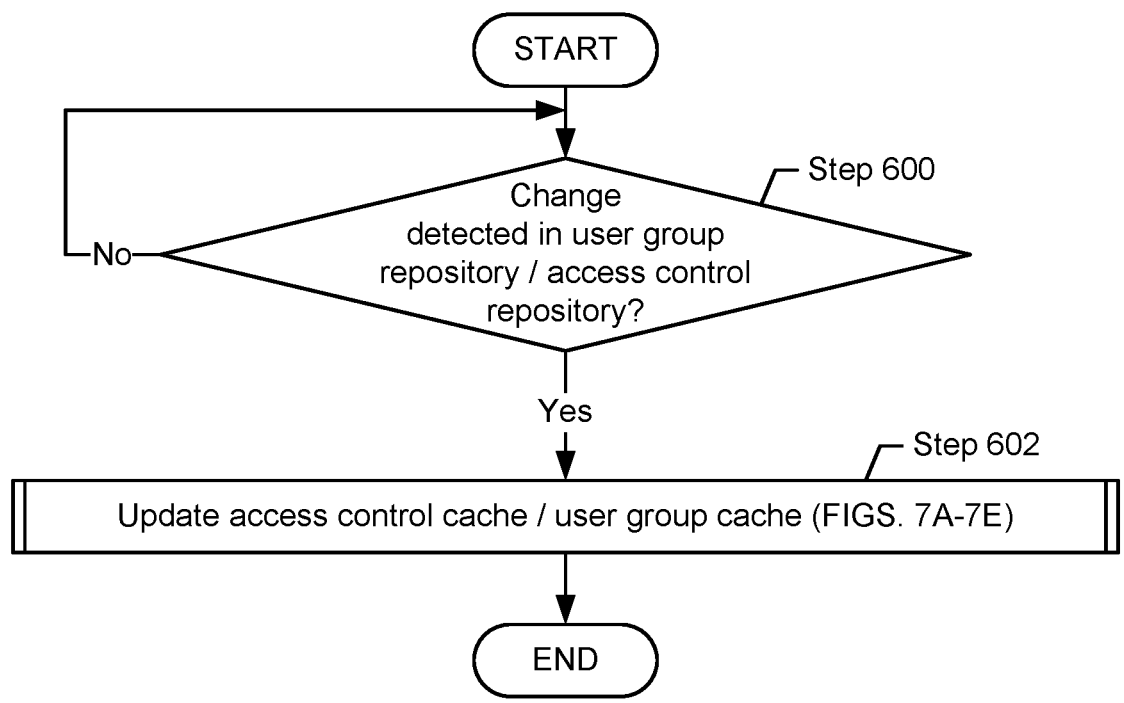
FIG. 6 shows a method for updating the user access control cache and/or the user group cache, in accordance with one or more embodiments of the technology.

FIG. 6 shows a method for updating the user access control cache and/or the user group cache, in accordance with one or more embodiments of the technology. An update of the user access control cache and/or the user group cache may become necessary whenever a change is made to the access control repository and/or to the user group repository. Changes that may result in the execution of the method shown in FIG. 6 include, but are not limited to an addition or removal of users and/or groups to/from an access control list in the access control repository, a change of a permission level, and an addition/removal of an access control list. Further, changes that may result in the execution of the method shown in FIG. 6 may also include an addition or removal of users or groups to/from a group.

In Step 600, a determination is made about whether a change has occurred in the user group repository and/or in the access control repository. Changes to the access control repository and/or the user group repository may be detected by comparing the current state of the repositories to earlier states of the repositories. Such a comparison may reveal, for example, that a particular user/group was added/removed. As a result of the detected change, Step 602 may be executed.

In Step 602, the access control cache and/or user group cache is updated. Depending on the type change to the access control repository and/or user group repository, as determined in Step 600, one of the methods of FIGS. 7A-7E is executed, as described below.

Figure 7A:
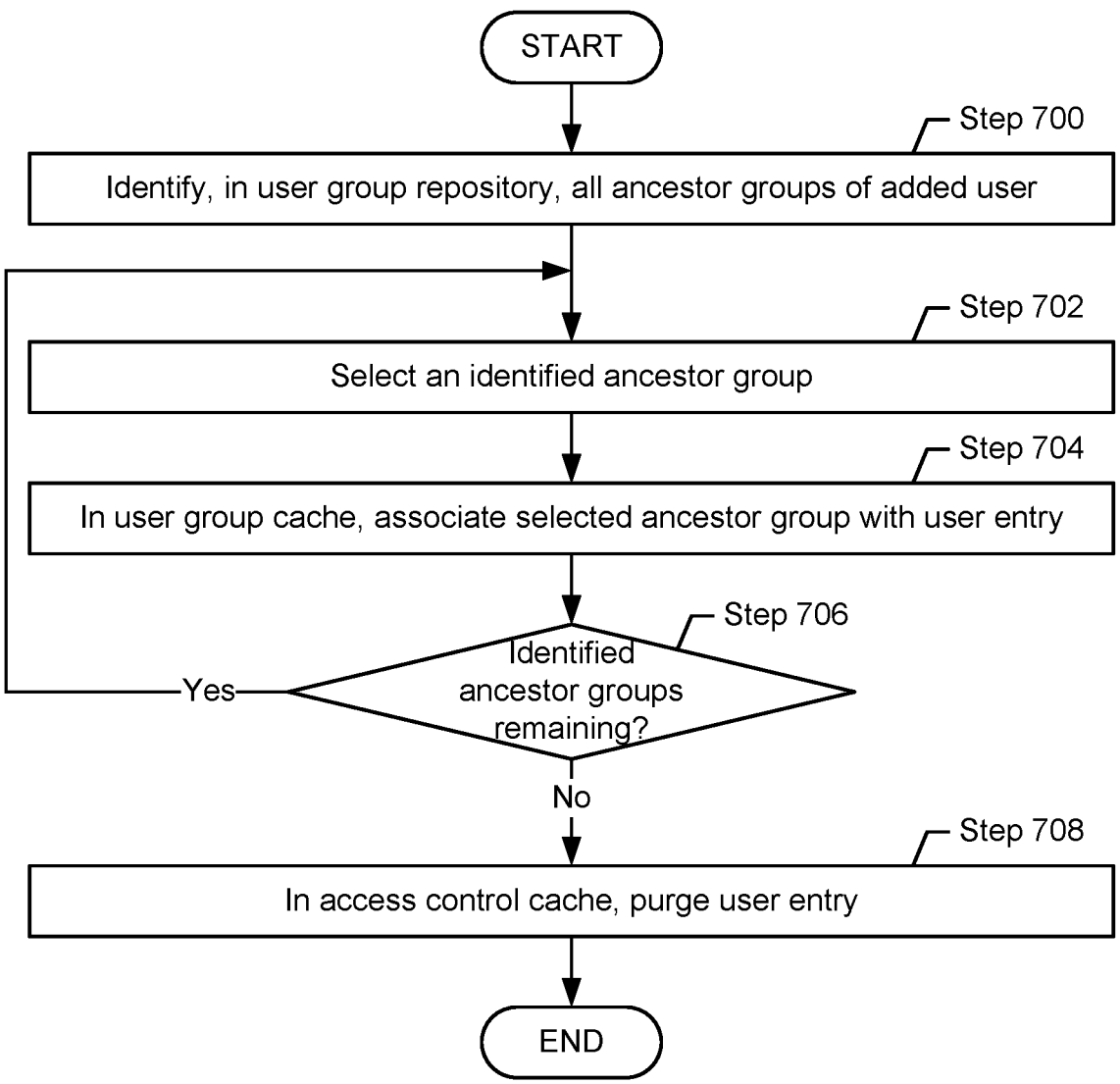
FIG. 7A shows a method for updating the user access control cache and/or the user group cache in response to the addition, in the user group repository, of a user to a user group, in accordance with one or more embodiments of the technology.
Figures 8D, 8E:
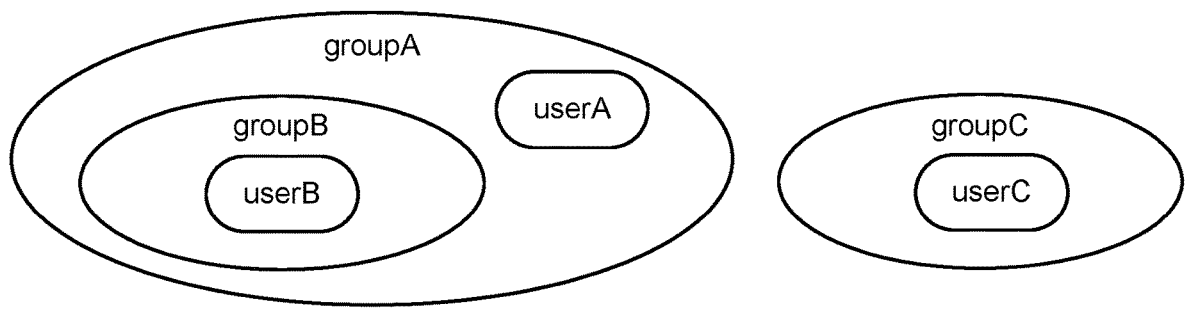
FIG. 8D shows an exemplary access control cache, in accordance with one or more embodiments of the technology.
FIG. 8E shows an exemplary user group cache, in accordance with one or more embodiments of the technology.

FIG. 7A shows a method for updating the user access control cache and/or the user group cache in response to the addition, in the user group repository, of a user to a group, in accordance with one or more embodiments of the technology.

Turning to FIG. 7A, in Step 700, all ancestor groups (e.g., parent and grandparent groups) are identified for the user that was added to a group. The identification may be performed as previously described in FIG. 4.

In Step 702, one of the ancestor groups is selected. Ancestor groups may be selected, for example, in alphabetical order, or in any other order. In Step 704, in the group cache, the selected ancestor group is associated with the user entry corresponding to the added user.

In Step 706, a determination is made about whether other ancestor groups were identified in Step 700. If so, Steps 702-704 may be repeated for these ancestor groups.

In Step 708, the user entry for the added user is purged in the access control cache. The user entry may be entirely removed. The purging is performed because, as a result of the changed group membership, the permission level of the user may have changed. Removal of the user entry from the access control cache triggers the generation of a new user entry, as described in FIG. 5. In one embodiment of the technology, the user entry is revised, rather than entirely removed. This may be the case, for example, when changes are limited to a particular access control list. In such a scenario, only the entry specific to the access control list is removed, whereas other entries, for other access control lists, may remain in the user entry. A new or updated user entry may be generated immediately after deletion from the access control cache, or at the time when a document search requires the entry.

Figure 7B:
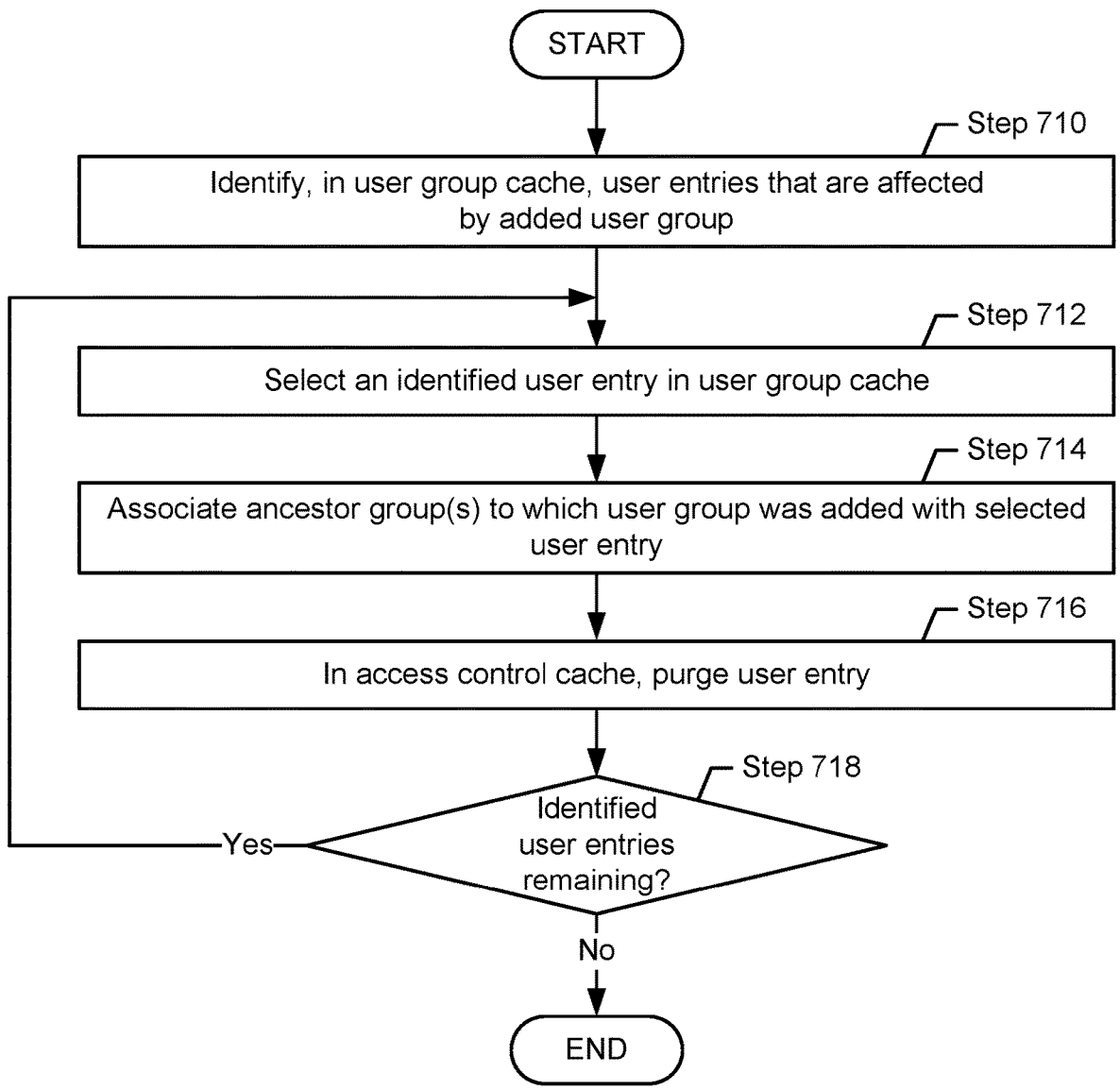
FIG. 7B shows a method for updating the user access control cache and/or the user group cache in response to the addition of a group, in the user group repository, in accordance with one or more embodiments of the technology.

FIG. 7B shows a method for updating the user access control cache and/or the user group cache in response to the addition of a group, e.g., to another group, in the user group repository, in accordance with one or more embodiments of the technology.

Turning to FIG. 7B, in Step 710, all user entries that are affected by the added group to the group cache are identified. Specifically, for each user in the user group cache, all associated groups are examined to determine whether the examined groups include the group that was added to another group.

In Step 712, one of the user entries that were identified as affected is selected. User entries may be selected, for example, based on the order of the user entries in the user group cache, or in any other order.

In Step 714, in the group cache, the ancestor group(s) to which the group was added is/are associated with the selected user entry. Consider, for example, a user C that initially is a member of group C only (i.e., group C is the only ancestor group of user C). Further, assume that a group A is updated to include group C. As a result, group A and group C are ancestor groups of user C. Thus, group A needs to be associated with the user entry for user C, in the user group cache.

In Step 716, the user entry for the added user is purged, in the access control cache. The user entry may be entirely removed. The purging is performed because, as a result of the changed group membership, the permission level of the user may have changed. Removal of the user entry from the access control cache triggers the generation of a new user entry, as described in FIG. 5. In one embodiment of the technology, the user entry is revised, rather than entirely removed. This may be the case, for example, when changes are limited to a particular access control list. In such a scenario, only the entry specific to the access control list is removed, whereas other entries, for other access control lists, may remain in the user entry. A new or revised user entry may be generated immediately after deletion from the access control cache, or at the time when a document search requires the entry.

In Step 718, a determination is made about whether other affected user entries are remaining. If so, Steps 712-716 may be repeated for these user entries.

Figure 7C:
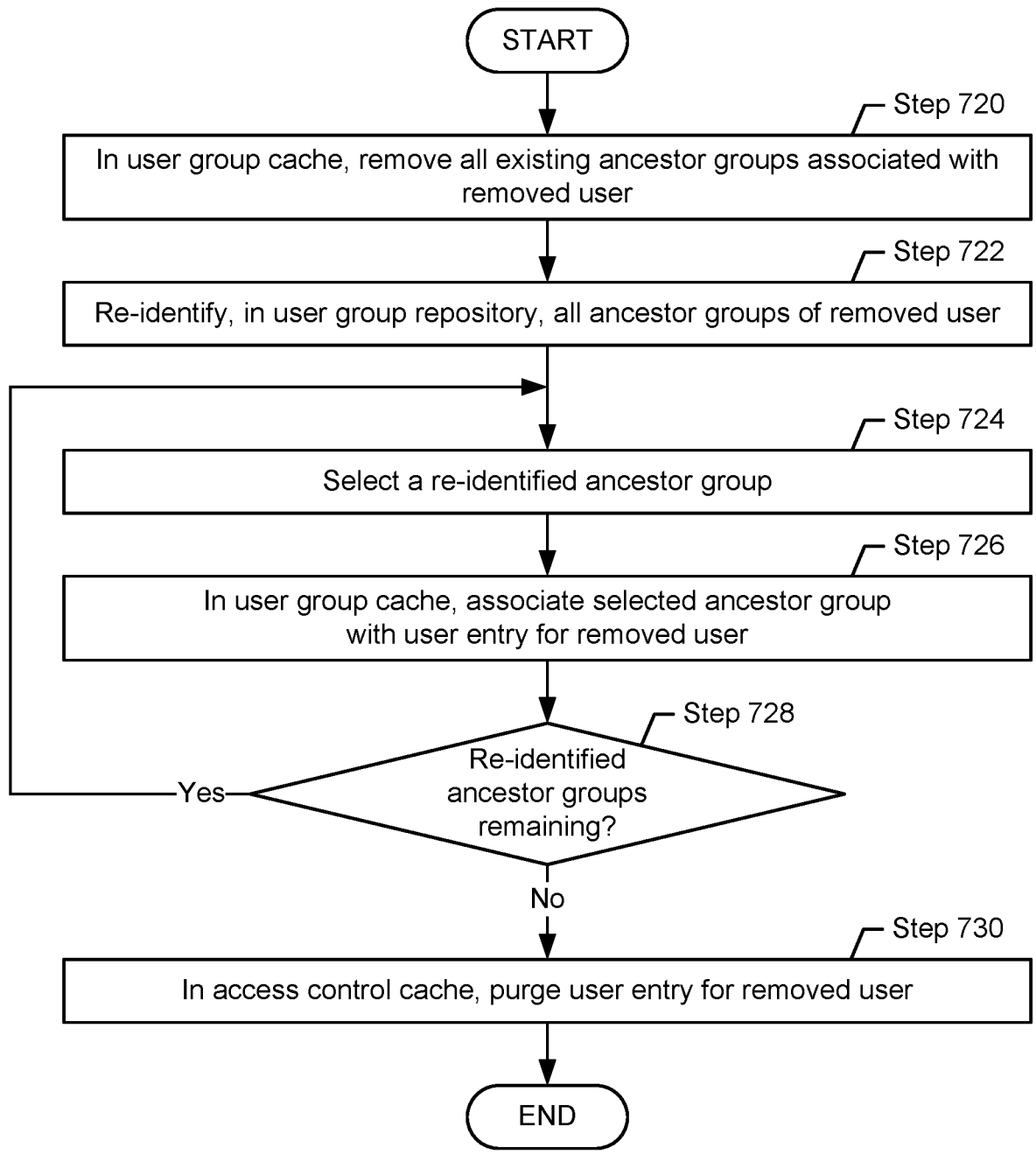
FIG. 7C shows a method for updating the user access control cache and/or the user group cache in response to the removal of a user from a group, in the user group repository, in accordance with one or more embodiments of the technology.

FIG. 7C shows a method for updating the user access control cache and/or the user group cache in response to the removal of a user from a group, in the user group repository, in accordance with one or more embodiments of the technology.

Turning to FIG. 7C, in Step 720, the association of all ancestor groups (e.g., parent groups, grandparent groups, etc.) are removed for the user entry.

In Step 722, all ancestor groups are re-identified for the user that was removed from the group. The re-identification may be performed, for example, as previously described in FIG. 4.

In Step 724, one of the re-identified ancestor groups is selected. An ancestor group may be selected, for example, based on the order of the ancestor groups in the user group cache, or in any other order.

In Step 726, the selected ancestor group is associated with the user, in the group cache.

In Step 728, a determination is made about whether other ancestor groups were identified in Step 722. If so, Steps 724-726 may be repeated for these ancestor groups.

In Step 730, the user entry for the user that was removed from the user group is purged, in the access control cache. The user entry may be entirely removed. The purging is performed because, as a result of the changed group membership, the permission level of the user may have changed. Removal of the user entry from the access control cache triggers the generation of a new user entry, as described in FIG. 5. In one embodiment of the technology, the user entry is revised, rather than entirely removed. This may be the case, for example, when changes are limited to a particular access control list. In such a scenario, only the entry specific to the access control list is removed, whereas other entries, for other access control lists, may remain in the user entry. A new or revised entry may be generated immediately after deletion from the access control cache, or at the time when a document search requires the entry.

Figure 7D:
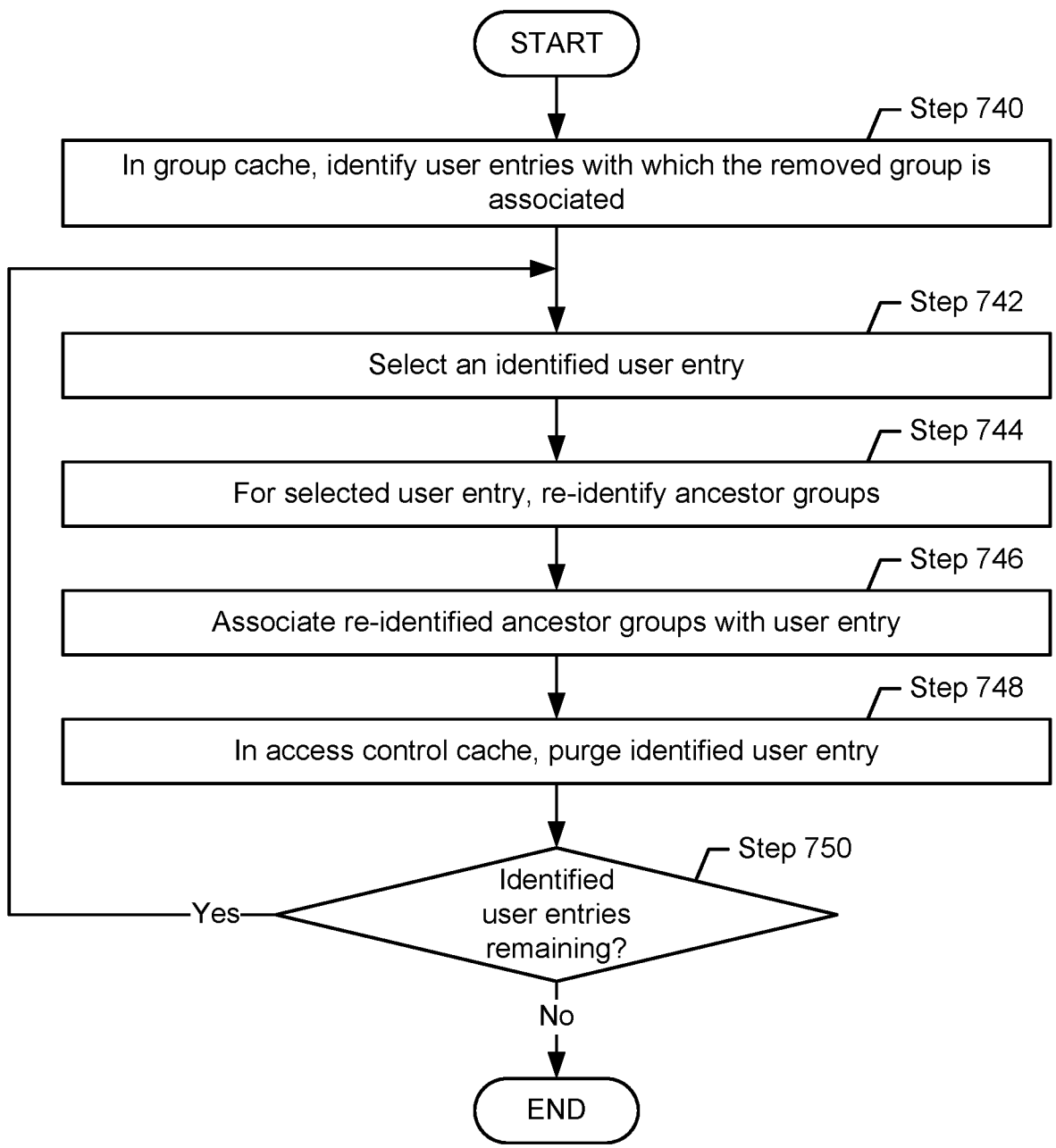
FIG. 7D shows a method for updating the user access control cache and/or the user group cache in response to the removal of a group, in the user group repository, in accordance with one or more embodiments of the technology.

FIG. 7D shows a method for updating the user access control cache and/or the user group cache in response to the removal of a group, in the user group repository, in accordance with one or more embodiments of the technology.

Turning to FIG. 7D, in Step 740, all user entries, in the user group cache, with which the removed group is associated, are identified In Step 742, one of the identified user entries is selected. A user entry may be selected, for example, based on the order of the user entries in the user group cache, or in any other order.

In Step 744, the ancestor groups for the user are re-identified. The re-identification may be performed as described in FIG. 4.

In Step 746, the re-identified ancestor groups are associated with the user, in the user group cache.

In Step 748, the user entry in the access control cache is purged. The user entry may be entirely removed. The purging is performed because, as a result of the changed group membership, the permission level of the user may have changed. Removal of the user entry from the access control cache triggers the generation of a new user entry, as described in FIG. 5. In one embodiment of the technology, the user entry is revised, rather than entirely removed. This may be the case, for example, when changes are limited to a particular access control list. In such a scenario, only the entry specific to the access control list is removed, whereas other entries, for other access control lists, may remain in the user entry. A new or revised user entry may be generated immediately after deletion from the access control cache, or at the time when a document search requires the entry.

In Step 750, a determination is made about whether other user entries that are affected by the removed group, are remaining. If so, Steps 742-748 may be repeated for these user entries.

Figure 7E:
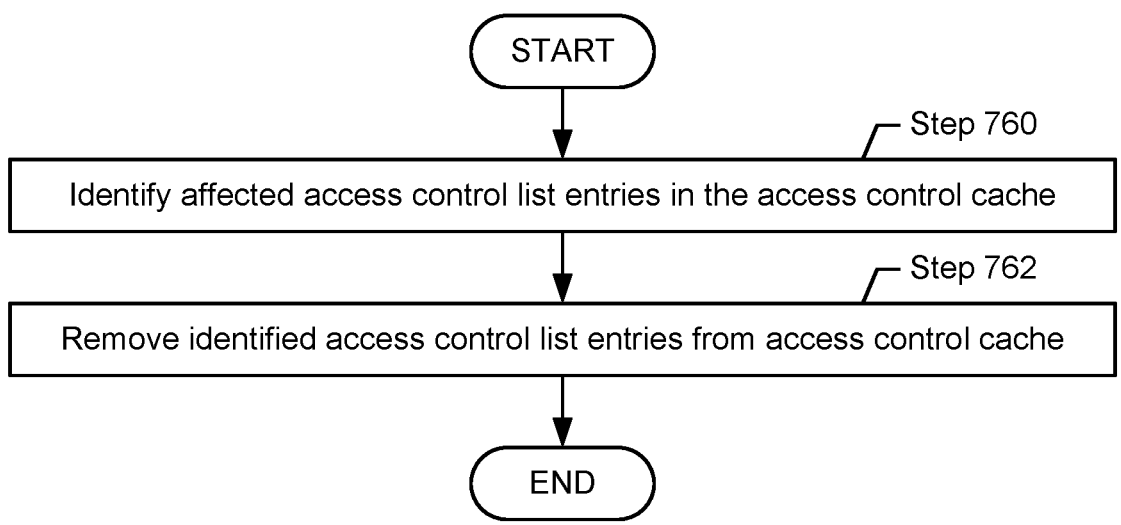
FIG. 7E shows a method for updating the user access control cache in response to a change in the access control repository, in accordance with one or more embodiments of the technology.

FIG. 7E shows a method for updating the user access control cache in response to a change in the access control repository, in accordance with one or more embodiments of the technology. The change in the access control repository may be any change, including, but not limited to an addition or removal of users and/or groups to/from an access control list in the access control repository, a change of a permission level, and an addition/removal of an access control list.

Turning to FIG. 7E, in Step 760, the affected access control list entries made for users, in the access control cache, are identified. Specifically, if a change is registered in a particular access control list in the access control repository, all instances of this access control list are identified in the access control cache. Consider a scenario in which an access control list 2 is affected by changes. Further assume that the exemplary access control cache of FIG. 8D is to be updated after detection of the change. As a result, all instances of "acl2" under "userA", "userB" and "userC" are identified as affected in the exemplary access control cache of FIG. 8D.

In Step 762, the identified access control list entries are removed from the access control cache.

The following use case scenarios are intended to provide examples of the methods for updating the access control cache and the user group cache. The methods described by FIGS. 2-7E are not limited to the subsequently described use cases.

Use case I: Update of the user group cache in response to the addition of a user to a user group (as described in FIG. 7A)

Consider a scenario in which the user group cache includes entries as shown in FIG. 8E. FIG. 8E graphically depicts the hierarchical organization of the users in groups, but also the representation used for storing group membership in the format of the user group cache. Assume that, starting from the configuration shown in FIG. 8E, the group repository is updated such that group B includes user C (see hierarchical group organization chart of FIG. 9A). During the execution of the method of FIG. 7A, the ancestor groups of user C are identified. By inspection of the user group repository, it is determined that the ancestor groups of user C are groups A, B, and C, as can also be seen in the hierarchical group organization chart of FIG. 9A. Accordingly, all of these ancestor groups are associated with user C, in the user group cache, as shown in the updated user group cache of FIG. 9A. In the access control cache, the entry for user C is deleted.

Use case II: Update of the user group cache in response to the addition of a user group to another user group (as described in FIG. 7B)

Consider, again, the scenario in which the user group cache includes entries as shown in FIG. 8E. Further, assume that, starting from the configuration shown in FIG. 8E, the group repository is updated such that group A includes group C (see hierarchical group organization chart of FIG. 9B). During the execution of the method of FIG. 7B, the user entries that are affected by the added group are identified by locating the user entries for which group C is considered an associated group. Inspection of the user group cache of FIG. 8E shows that only user C is affected. The ancestor group to which group C was added is group A. Accordingly, an association of group A with user C is added to the user group cache. In the access control cache, the entry for user C is deleted.

Use case III: Update of the user group cache in response to the removal of a user from a user group (as described in FIG. 7C)

Figure 9A:
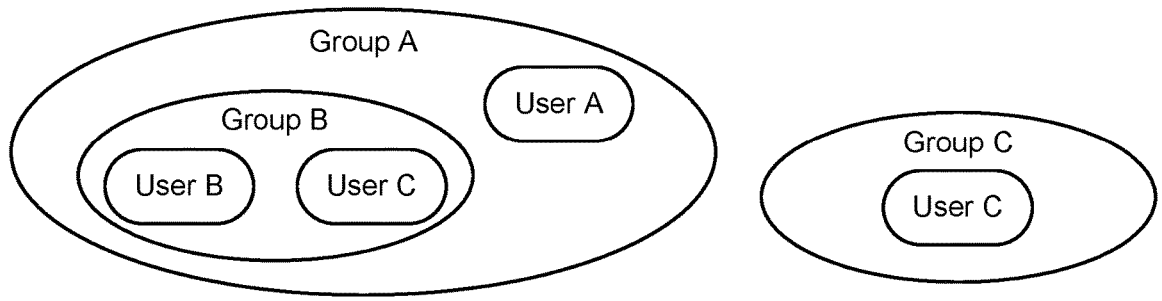
FIGS. 9A-9D show the updating of user group caches, in accordance with one or more embodiments of the technology.
Figure 9B:
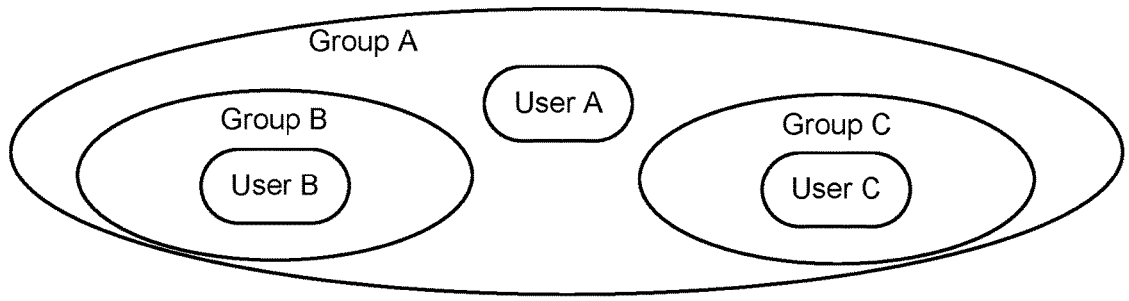
Figure 9C:
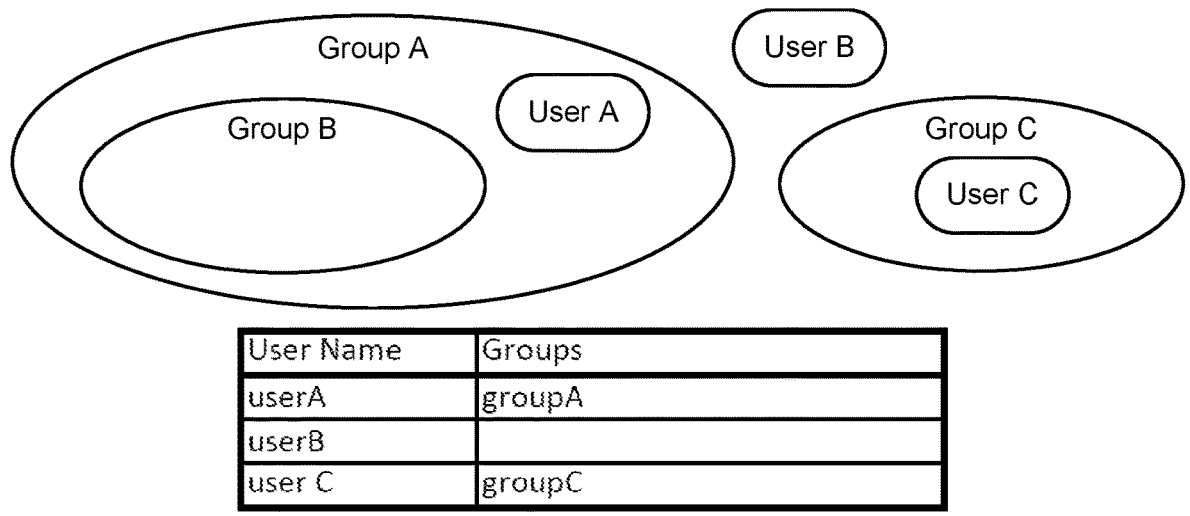

Consider, again, the scenario in which the user group cache includes entries as shown in FIG. 8E. Further, assume that, starting from the configuration shown in FIG. 8E, the group repository is updated such that group B does no longer include user B (see hierarchical group organization chart of FIG. 9C). During the execution of the method of FIG. 7C, the association of all ancestor groups of user B is removed. Next, all ancestor groups of user B are identified. However, user B no longer has any ancestor groups. The user group cache is updated accordingly, as shown in FIG. 9C. In the access control cache, the entry for user B is deleted.

Use case IV: Update of the user group cache in response to the removal of a user group from another user group (as described in FIG. 7D)

Figure 9D:
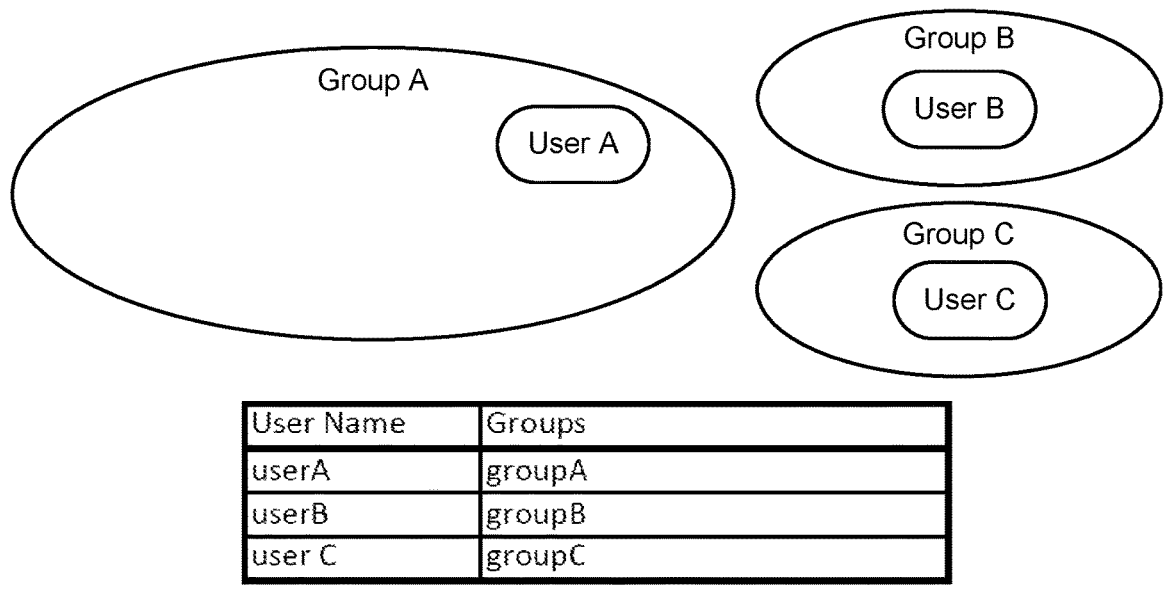

Consider, again, the scenario in which the user group cache includes entries as shown in FIG. 8E. Further, assume that, starting from the configuration shown in FIG. 8E, the group repository is updated such that group B is removed from group A (see hierarchical group organization chart of FIG. 9D). During the execution of the method of FIG. 7D, the user entries that include the removed group are identified. It is found that group B is associated only with user B. Accordingly, the ancestor groups are re-identified for user B. From the user group repository, it is found that the only ancestor group for user B now is group B. The user B entry in the user group cache is updated accordingly, as shown in FIG. 9D. In the access control cache, the entry for user B is deleted.

Figure 10:
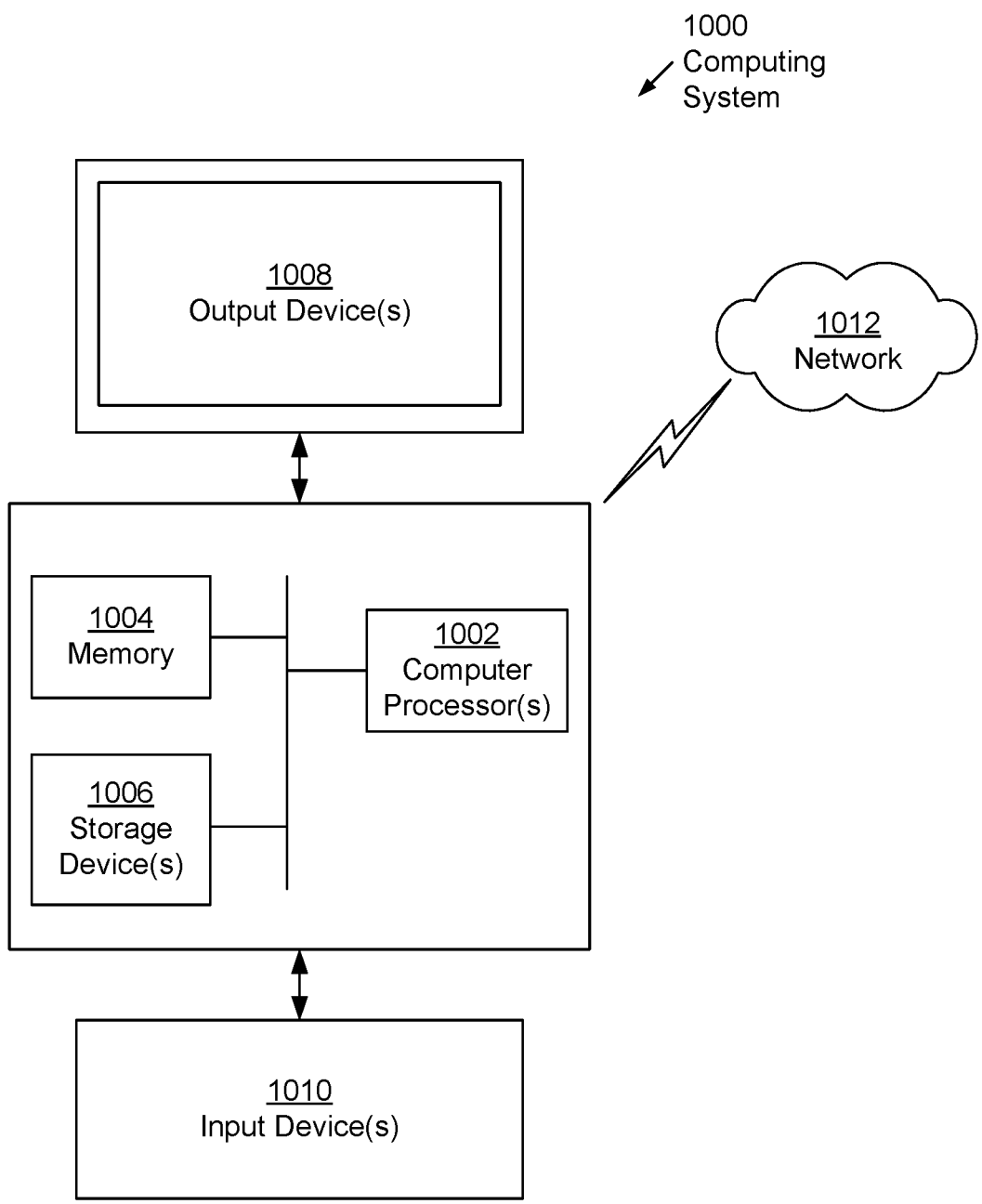
FIG. 10 shows a computing system in accordance with one or more embodiments of the technology.

Embodiments of the technology may be implemented on a computing system. Any combination of mobile, desktop, server, embedded, or other types of hardware may be used. For example, as shown in FIG. 10, the computing system (1000) may include one or more computer processor(s) (1002), associated memory (1004) (e.g., random access memory (RAM), cache memory, flash memory, etc.), one or more storage device(s) (1006) (e.g., a hard disk, an optical drive such as a compact disk (CD) drive or digital versatile disk (DVD) drive, a flash memory stick, etc.), and numerous other elements and functionalities. The computer processor(s) (1002) may be an integrated circuit for processing instructions. For example, the computer processor(s) may be one or more cores, or micro-cores of a processor. The computing system (1000) may also include one or more input device(s) (1010), such as a touchscreen, keyboard, mouse, microphone, touchpad, electronic pen, or any other type of input device. Further, the computing system (1000) may include one or more output device(s) (1008), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1000) may be connected to a network (1012) (e.g., a local area network (LAN), a wide area network (WAN) such as the Internet, mobile network, or any other type of network) via a network interface connection (not shown). The input and output device(s) may be locally or remotely (e.g., via the network (1012)) connected to the computer processor(s) (1002), memory (1004), and storage device(s) (1006). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (1000) may be located at a remote location and connected to the other elements over a network (1012). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for servicing document search requests, comprising:
   receiving, by a document management service, a document search query from a requesting user;
   identifying, in a document repository, by the document management service, a document that matches the document search query;
   generating, by the document management service, an entry for the requesting user in a user group cache, comprising:
      identifying, in a user group repository, ancestor groups of the requesting user, wherein the ancestor groups comprise parent and grandparent groups; and
      generating, in the user group cache, the entry that associates identified ancestor groups with the requesting user;
   obtaining, by the document management service, a permission level from an access control cache, wherein the permission level is based on:
      the entry; and content of an access control repository, wherein the access control cache is located on the document management service, and
      wherein the access control repository and the document repository are located on a repository server, separate from the document management service;
   making a first determination that the permission level is sufficient; and
   returning, based on the first determination, the document to the requesting user as a search result.

2. The method of claim 1, wherein populating the access control cache comprises:
   selecting, in the user group cache, the ancestor groups associated with the requesting user;
   making a second determination that one of the associated ancestor groups matches an accessor in the access control repository;

obtaining, based on the second determination, an accessor permission level from the access control repository; and storing, in the access control cache, an entry for the requesting user, comprising the accessor permission level.

3. The method of claim 1, further comprising:

making a second determination that at least one selected from a group consisting of the user group repository and the access control repository has changed, and based on the second determination:

updating at least one of the access control cache and the user group cache.

4. The method of claim 3, wherein updating at least one of the access control cache and the user group cache comprises making a third determination that a user was added to a user group, in the user group repository, and based on the third determination:

identifying, in the user group repository, ancestor groups of the added user;

for each of the identified ancestor groups, in the user group cache, associating the ancestor group with the added user, in the user group cache; and purging an entry for the added user, in the access control cache.

5. The method of claim 3, wherein updating at least one of the access control cache and the user group cache comprises making a third determination that a user group was added in the user group repository, and based on the third determination:

identifying, in the user group cache, user entries that are affected by the added user group;

for each of the identified user entries:
associating ancestor groups to which the user group was added with the user entry; and
purging the identified user entry, in the access control cache.

6. The method of claim 3, wherein updating at least one of the access control cache and the user group cache comprises making a third determination that a user was removed from a user group in the user group repository, and based on the third determination:

removing ancestor groups that are associated with the removed user from the user group cache;

identifying, in the user group repository, ancestor groups of the removed user;

for each of the identified ancestor groups, associating the ancestor group with a user entry for the removed user, in the user group cache; and purging the user entry for the removed user, in the access control cache.

7. The method of claim 3, wherein updating at least one of the access control cache and the user group cache comprises making a third determination that a user group was removed in the user group repository, and based on the third determination:

identifying, in the user group cache, user entries with which the removed group is associated;

for each of the identified user entries:
identifying ancestor groups and associating re-identified ancestor groups with the user entry; and
purging the identified user entry in the access control cache.

8. The method of claim 3, wherein updating at least one of the access control cache and the user group cache comprises making a third determination that the access control repository has changed, and based on the third determination:

identifying, in the access control cache, access control list entries that are affected by the change; and removing the identified access control list entries from the access control cache.

9. A non-transitory computer readable medium (CRM) comprising instructions that enable a system for servicing document search requests to:

receive, by a document management service, a document search query from a requesting user;

identify, in a document repository, by the document management service, a document that matches the document search query;

generate, by the document management service, an entry for the requesting user in a user group cache, comprising:

identifying, in a user group repository, ancestor groups of the requesting user, wherein the ancestor groups comprise parent and grandparent groups; and generating, in the user group cache, the entry that associates identified ancestor groups with the requesting user;

obtain, by the document management service, a permission level from an access control cache, wherein the permission level is based on:

the entry; and content of an access control repository, wherein the access control cache is located on the document management service, and wherein the access control repository and the document repository are located on a repository server, separate from the document management service;

make a first determination that the permission level is sufficient; and return, based on the first determination, the document to the requesting user as a search result.

10. The non-transitory CRM of claim 9, wherein populating the access control cache comprises:

selecting, in the user group cache, the ancestor groups associated with the requesting user;

making a second determination that one of the associated ancestor groups matches an accessor in the access control repository;

obtaining an accessor permission level from the access control repository; and storing, in the access control cache, an entry for the requesting user, comprising the accessor permission level.

11. The non-transitory CRM of claim 9, wherein populating the access control cache comprises:

identifying, in the access control repository, an entry for an accessor that matches the requesting user;

obtaining, from the identified entry, an accessor permission level; and storing, in the access control cache, an entry for the requesting user, comprising the accessor permission level.

12. The non-transitory CRM of claim 9, wherein the instructions further enable the system for servicing document search requests to:

make a second determination that at least one selected from a group consisting of the user group repository and the access control repository has changed, and based on the second determination:

update at least one of the access control cache and the user group cache.

13. A system for servicing document search requests, the system comprising:
- a processor, wherein the processor is an integrated circuit;
- a document management service comprising an access control cache; and a user group cache; and
- a repository server, separate from the document management service, comprising a document repository; an access control repository; and a user group repository;
- wherein the document management service, when executed by the processor, enables the document management service to:
  - receive a document search query from a requesting user;
  - identify, in the document repository, a document that matches the document search query;
  - generate an entry for the requesting user in the user group cache, comprising:
    - identifying, in the user group repository, ancestor groups of the requesting user, wherein the ancestor groups comprise parent and grandparent groups; and
    - generating, in the user group cache, an entry that associates identified ancestor groups with the requesting user;
  - obtain a permission level from the access control cache, wherein the permission level is based on: the entry; and content of the access control repository, and wherein the access control cache is located on the document management service,
  - make a first determination that the permission level is sufficient;
  - return, based on the first determination, the document to the requesting user as a search result; and
  - make a second determination that at least one selected from a group consisting of the user group repository and the access control repository has changed, and based on the determination:
    - update at least one of the access control cache and the user group cache.

14. The system of claim 13, wherein populating the access control cache comprises:
- selecting, in the user group cache, the ancestor groups associated with the requesting user;
- making a third determination that one of the associated ancestor groups matches an accessor in the access control repository;
- obtaining an accessor permission level from the access control repository; and
- storing, in the access control cache, an entry for the requesting user, comprising the accessor permission level.

15. The system of claim 13,
- wherein the repository server further comprises the user group repository; and
- wherein the document management service further makes a third determination that at least one selected from the group consisting of the user group repository and the access control repository has changed, and based on the third determination:
  - updates at least one of the access control cache and the user group cache.

* * * * *